United States Patent

Brill

[15] 3,692,392
[45] Sept. 19, 1972

[54] FILM CARTRIDGE
[72] Inventor: Henry L. Brill, Flushing, N.Y.
[73] Assignee: E. R. E. Laboratory, Inc., West Orange, N.J.
[22] Filed: April 19, 1971
[21] Appl. No.: 135,160

[52] U.S. Cl. .............................. 352/128, 352/78 R
[51] Int. Cl. ............................................ G03b 21/00
[58] Field of Search ........ 352/72, 77, 78 R, 126, 128

[56] References Cited

UNITED STATES PATENTS

| 3,591,271 | 7/1971 | Shropshire | 352/128 X |
| 1,824,709 | 9/1931 | Debrie | 352/77 |
| 3,442,580 | 5/1969 | Winkler | 352/72 X |

Primary Examiner—Samuel S. Matthews
Assistant Examiner—Fred L. Braun
Attorney—George H. Fritzinger

[57] ABSTRACT

An endless film cartridge has a lock pin to engage a sprocket hole of the film as the cartridge is removed from its holder. The lock pin holds the film correctly framed in the aperture window and assures proper engagement of the drive teeth with the film when the cartridge is mounted again in the holder. The guide pad on the holder pushes a pressure plate inwardly of the cartridge to release the film from the lock pin as the cartridge is mounted.

7 Claims, 4 Drawing Figures

INVENTOR.
HENRY L. BRILL

BY George H Fritzinger

AGENT

INVENTOR
HENRY L. BRILL

BY George H. Fritzinger

AGENT

FILM CARTRIDGE

An object of the invention is to provide a film cartridge with a simple and economical lock means to retain the film in correct position for remounting while the cartridge is removed from the holder and which is automatically released as the cartridge is remounted.

Another object is to provide such film cartridge with a lock means to assure that the film drive means will correctly engage the sprocket holes of the film as the cartridge is mounted in the holder and which is released automatically as the cartridge reaches a mounted position.

These and other objects and features of the invention will be apparent from the following description and the appended claims.

In the description of my invention reference is had to the accompanying drawings, of which:

Figure 1:
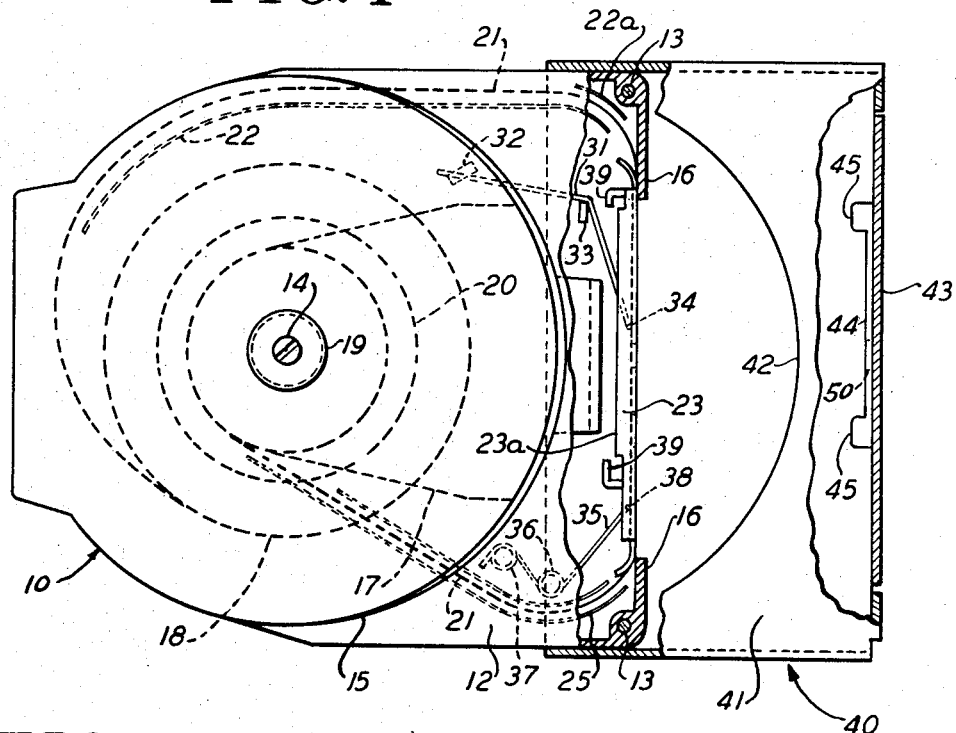
FIG. 1 is a side elevational view of an endless loop cartridge and a cartridge holder showing the holder and cartridge partly broken away and in a partially assembled relationship.

The film cartridge 10 comprises two sections 11 and 12 of a U-shaped contour which engage at a medial plane M and which are interlocked by dowels indicated at 13 (FIG. 1) and retained in assembled relationship by a central screw 14. Section 12 has a circular portion 15 outwardly extending obliquely from the side wall thereof proceeding from the circular end to the flat end wall 16 of the section. The section 11 has an internal oblong cavity 17 open to the side and leading to the flat end wall 16. The inner wall of this cavity is parallel to the outer wall of the circular portion 15 and is spaced therefrom to form a shallow cylindrical chamber in the circular portion 15 for a supply roll 18 of film. This chamber has a central cylindrical core 19 on which a flanged spool 20 is rotatably mounted for carrying the supply roll 18. It is into this core 19 that the screw 14 is threaded.

A loop 21 of the film leads from the outer convolution of the role 18 through a guideway 22 along the upper wall of the cartridge as it is mounted in the projector. This guideway has a curved end portion 22a leading the film downwardly along the flat end wall 16 of the cartridge whereat it is retained by a vertical metal guide strip and pressure plate 23 bridging the end of the cartridge from wall to wall. This pressure plate has a shallow depression 24 lengthwise thereof to clear it from the picture frames of the film. Leading from the lower end of the pressure plate is a curved guideway 25 directing the loop 21 of the film back to the inner convolution of the supply roll 18.

Figure 2:
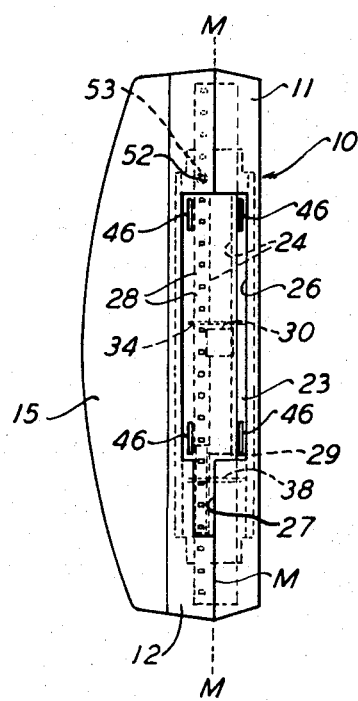
FIG. 2 is a right end view of the cartridge only.
Figure 3:
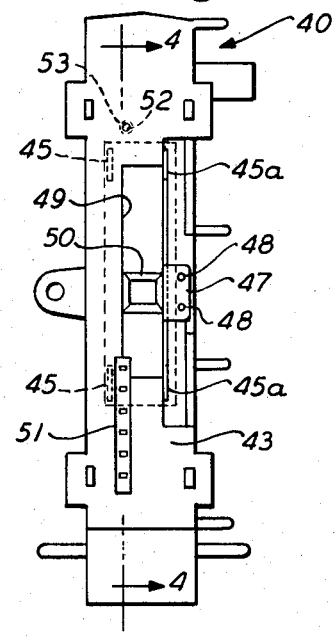
FIG. 3 is a right end view of the holder with the cartridge.
Figure 4:
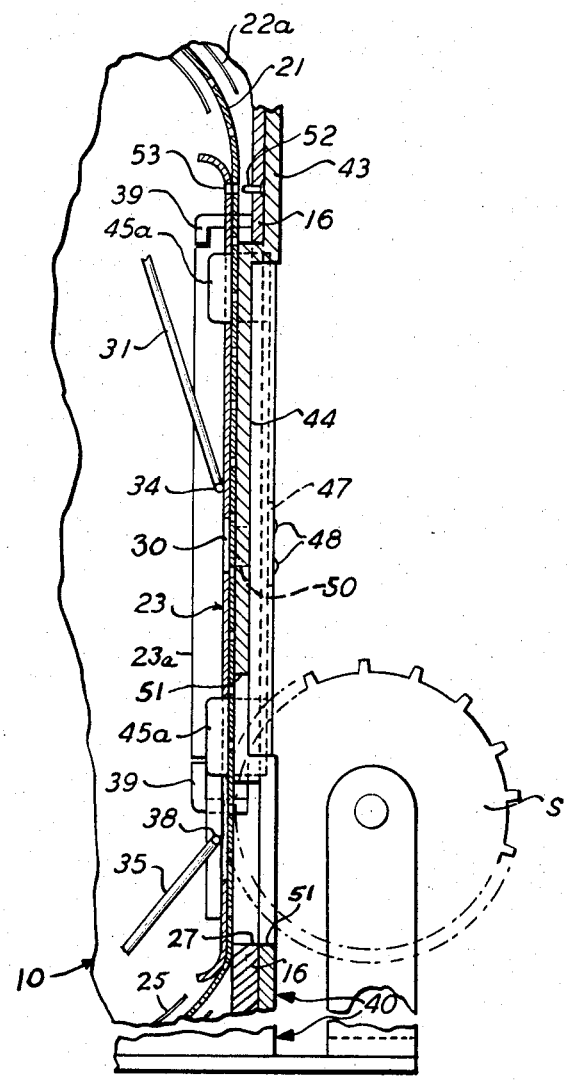
FIG. 4 is a fractional sectional view taken on the line 4—4 of FIG. 3 and showing the front end portion of the cartridge in mounted relation to the holder.

In the flat end wall 16 of the cartridge there is a rectangular opening 26 extending nearly from side wall to side wall of the cartridge and at the bottom of this opening there is an extending slot 27 in line with the sprocket holes 28 in the film (FIG. 2) for receiving a sprocket wheel S. A corresponding slot 29 in the pressure plate provides clearance for the teeth of the sprocket wheel. The pressure plate has a central rectangular opening 30 which is a lens aperture to expose a single frame of the film. Within the cartridge there is a nearly L-shaped wire spring 31 anchored at its outer end against an internal lug 32 and at its apex around another internal lug 33. The other end of this spring has a tail 34 turned over at right angles thereto which bears against the pressure plate 23 just above the lens aperture 30. A wire torsion spring 35 has its coil on a short internal post 36 of the cartridge and has one end anchored against the stud 37 and the other end provided with a right angle tail piece 38 which bears against the lower portion of the pressure plate 23. These two springs hold the pressure plate and the corresponding straight run of the loop of the film yieldably against the flat end wall 16 of the cartridge. The pressure plate is confined to a narrow range of displacement inwardly of the cartridge by the abutment of side flanges 23a thereof against ribs 39 on the inside wall of the cartridge. The cartridge holder comprises a rectangular case 40 open at one end to receive slidably the cartridge flat end first. One wall 41 of this case 40 has a circular cutaway 42 to clear the circular side portion 15 in the cartridge. In the other wall of the cartridge there are the usual spring-pressed plungers (not shown) to engage frictionally the corresponding side wall in the cartridge to hold the cartridge in place after it is pressed into the case. The front end wall 43 of the case has an inset pad 44 with inwardly extending guide lugs 45 at its four corners. As the cartridge is pressed to the end of the case 40 into a fully mounted position the pad 44 enters the rectangular opening 26 of the cartridge and presses the pressure plate 23 inwardly of the cartridge. At the same time the four lugs 45 engage respective rectangular openings 46 in the pressure plate. These lugs serve to retain the straight run of the film in a centered relation widthwise of the cartridge so that the frames will be centered widthwise of the cartridge relative to the aperture lens 30. Two of the lugs 45 at the right side of the cartridge, indicated as 45a in FIG. 3, are cantilever mounted from a central bracket 47 to which they are secured by rivets 48, the bracket being a side extension of the pad 44. In the front wall of the holder there is a wide rectangular recess 49, a lens aperture 50 in the pad 44 and a downwardly extending clearance slot 51 for the sprocket wheel S much the same as in the cartridge and pressure plate 23.

The difficulty encountered heretofore is that the straight run of the film exposed via the front opening 26 of the cartridge can be displaced by accidental contact during handling of the cartridge with the result that when the cartridge is pressed into the holder the sprocket holes of the film are not aligned with the sprocket teeth. This could cause damage to the edges of the sprocket holes and will cause also inaccurate control of the framing of the film with the lens aperture 30 at the start of the projector after a cartridge is remounted in the holder. These difficulties are overcome in the present cartridge by providing the same with an internal lock pin 52 on the end wall 16 which is positioned to engage a sprocket hole in the straight run of the film backed by the pressure plate 23 when the film is correctly framed relative to the lens aperture 30. Further, when the film is so correctly framed then the sprocket holes in the film are also correctly positioned to engage the film drive means be it a sprocket wheel as shown or the common reciprocating claw. This lock pin is not long enough to engage the film when the pressure plate is held by the pad 44 of the holder in its inwardly displaced position, thereby leaving the film in a free condition to be driven by the sprocket wheel S. However, as the cartridge is withdrawn from the holder the pressure plate 23 is returned by the springs 31-35 to cause the lock pin to engage a sprocket hole of the straight run of the film and to move through a clearance hole 53 in the pressure plate. The film is therefore correctly retained in position without any possible displacement during the handling of the cartridge. When the cartridge is again inserted in the holder the film and pressure plate are again displaced inwardly to free the film from the lock pin and allow the film again to be driven by the sprocket wheel S.

The description of my invention hereinabove given is intended to be illustrative and not necessarily limitative of the invention since the same is subject to changes and modifications without departure from the scope of my invention, which I endeavor to express according to the following claims.

I claim:

1. A film cartridge comprising a case, a reel in said case, an endless supply roll of film on said reel having successive picture frames and respective sprocket holes therealong, said roll having a loop between the inner and outer convolutions thereof, a flat end wall on said case and guide means leading said loop along the inner side of said end wall, said end wall having an opening exposing a portion of said loop, a pressure plate on the inner side of said loop spanning said opening, means biasing said pressure plate outwardly to retain said loop portion against said end wall, a lens aperture in said pressure plate, a lock pin on said inner side of said end wall beyond one end of said opening for detachably engaging a sprocket hole of the loop portion of the film to retain the film in a position wherein a frame thereof is correctly located at said lens aperture, and means mounting said pressure plate for displacement inwardly of the cartridge whereby upon pressing against the film via said opening the film is displaced inwardly of said case and detached from said lock pin.

2. The cartridge set forth in claim 1 including a holder for detachably receiving said cartridge in a mounted position, a drive member on said holder having a tooth for engaging a sprocket hole in a loop portion of the film exposed by said opening in the cartridge, wherein said lock pin retains the film in said cartridge in a position for correct engagement of said drive member with the film as said cartridge is inserted in said holder.

3. The cartridge and holder set forth in claim 2 including an internal pad on an end wall of said holder for pushing the film and pressure plate inwardly of said cartridge to detach the film from said lock pin as the cartridge is inserted into a mounted position in said holder.

4. The cartridge and holder as set forth in claim 3 including locating lugs extending from said pad inwardly of said holder, and openings in said pressure plate for receiving said locating lugs as the cartridge is mounted in said holder.

5. The cartridge and holder set forth in claim 4 wherein a pair of said lugs are positioned to engage said pressure plate at opposite sides of said film to confine the film width-wise in a correct path relative to said lens aperture.

6. The cartridge and holder set forth in claim 5 including two pairs of said lugs wherein one of each of said pair of lugs is spring mounted and urged towards the other, and stop means in said holder limiting each spring urged lug at a distance equal to the width of the film from the other lug of the respective pair.

7. The cartridge and holder set forth in claim 5 including two pairs of said lugs on said pad at opposite sides of said lens aperture.

* * * * *